Patented Feb. 3, 1953

2,627,524

UNITED STATES PATENT OFFICE 2,627,524

HYDROXY CARBAMATES AND PROCESS OF PRODUCING SAME

John David Malkemus, Austin, Tex., assignor to Jefferson Chemical Company, Inc., New York, N. Y., a corporation of Delaware No Drawing. Application November 17, 1949, Serial No. 128,000

16 Claims. (Cl. 260—482)

1

This invention relates to new chemical compounds and to the production of such compounds.

The new compounds have the following structural formula:

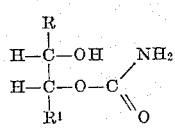

in which R and R¹ are hydrogen or a monovalent radical containing only hydrogen and carbon, such for example as alkyl, aryl, and alkenyl (a monovalent radical containing a double bond), the latter including allyl and vinyl. Examples of such compounds are the hydroxyalkyl carbamates, e. g., hydroxyethyl carbamate and its homologues, viz., hydroxypropyl, hydroxybutyl, etc. carbamate and hydroxyalkenyl carbamates, e. g., hydroxybutenyl carbamates, which, it will be noted, are vicinal hydroxy lower-alkyl and lower-alkenyl carbamates.

Surprisingly, it has been found that carbonates having the following structural formula:

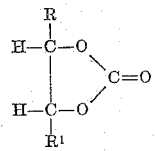

in which R and R¹ (which may be the same or different) are hydrogen or a monovalent radical containing only hydrogen and carbon, such, for example, as alkyl, aryl, and alkenyl, the latter including allyl and vinyl, react with ammonia to produce the corresponding carbamates. Thus ethylene carbonate and its homologues, such as propylene carbonate, butylene carbonate, etc., react with ammonia to produce the corresponding hydroxyalkyl carbamates. Erythryl carbonate (vinyl ethylene carbonate) reacts with ammonia to produce hydroxybutenyl carbamates. In the case of the unsymmetrical higher homologues of ethylene carbonate probably a mixture of the structurally isomeric hydroxyalkyl carbamates result.

The reaction is indicated by the following equation:

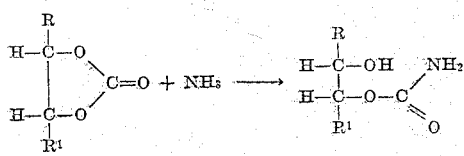

in which R and R¹ are hydrogen or the radicals above-mentioned.

2

The reaction to produce hydroxyethyl carbamate is indicated by the following equation:

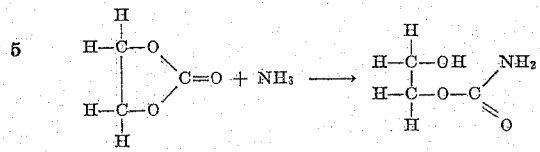

The physical properties of the carbamates of this invention will depend on the substituents R and R¹ in the above structural formula. The carbamates derived from glycols having not more than 4 carbon atoms are soluble in water, dilute acids, dilute bases, methanol, ethanol, acetone and dioxane. They are insoluble in ether, benzene, and chloroform. They evolve ammonia on boiling with sodium hydroxide solutions. They are useful in the synthesis of plastic materials and as intermediates in the manufacture of drugs and pharmaceuticals. They are excellent plasticizers for water soluble resins, such as polyvinyl alcohols. They also find utility as additives to alcohol and ketone solvents to modify the solvent properties of such solvents.

To carry out the reaction it is only necessary to mix the carbonate with ammonia in the proportion of more than one mol of ammonia per mol of carbonate at a temperature not exceeding about 50° C. The ammonia may be added as an aqueous solution of desired concentration or as anhydrous ammonia. After the reaction has taken place, the reaction mixture is distilled, preferably under vacuum, to remove unreacted ammonia. The ammonia-free reaction mixture is then fractionally distilled under vacuum to recover the carbamate.

The following examples illustrate the invention, but are not to be regarded as limiting it in any way. In these examples, all parts are by weight.

*Example 1.—Preparation of hydroxyethyl carbamate*

440 parts of ethylene carbonate were slowly added to a reaction vessel along with 1520 parts of concentrated (28%) ammonium hydroxide solution. The temperature of this mixture was held below 50° C., in general within the range of 40° to 50° C. One-half hour was required for the addition of the reactants which were introduced in approximately a 1 to 5 mol ratio, after which the reaction mixture was stirred at 40° to 45° C. for another half hour. A homogeneous, clear and colorless solution resulted.

The reaction mixture was then distilled under vacuum and ammonia and water vapor removed.

The temperature was raised gradually and the pressure reduced until the final phase of this distillation was conducted at 95° C. and 200 mm. Hg pressure. After substantially all of the ammonia and most of the water had been removed, 602 parts of residue remained.

This residue was distilled under vacuum in a fractionating column to drive off residual water and glycols present. When the temperature at the head of the column reached 95° C. at a pressure of 10 mm. of Hg, the temperature of the liquid subjected to distillation was 122° C. At this point 354 parts of residue remained. This residue was subjected to fractional distillation and fractions collected as follows:

| Fraction | Pressure, mm. Hg | Still Pot Temperature, °C. | Vapor Temp., °C. | Parts of Fraction Collected | $\left(n_D^{20°\,C.}\right)$ Refractive Index of Fraction |
|---|---|---|---|---|---|
| 1 | 10 | 120–166 | 95–96 | 65.3 | 1.4318 |
| 2 | 1.5 | ca. 136 | ca. 110 | 5.3 | 1.4348 |
| 3 | 1.2–1.4 | 137–138 | 110–128 | 19.5 | 1.4558 |
| 4 | 1–1.2 | 138–141 | 128–130 | 58.7 | 1.4648 |
| 5 | 0.8–1 | 141–157 | 130–132 | 156.0 | 1.4652 |
| 6 | 1.3–3.0 | 157–194 | 132–150 | 20.5 | 1.4652 |
| 7 | 3.0–3.2 | 194–212 | 150–153 | 9.6 | 1.4678 |
| residue | | | | 9.9 | |

Fractions 4, 5 and 6 contain the desired product, with fraction 5 the purest sample. Titration with hydrochloric acid showed that it required substantially no acid for neutralization establishing that this product was not ethanolamine which might be expected to be formed in the reaction. Analysis of samples of the product showed it contained a carbon, hydrogen, nitrogen and oxygen content corresponding to the calculated amounts of these elements present in hydroxyethyl carbamate. Another appropriate name for this compound is ethylene glycol monocarbamate.

Fraction 5 is a colorless, viscous liquid without any odor when prepared. It is very soluble in water, dilute acids and dilute bases. It is soluble in methanol, ethanol, acetone and dioxane. It is insoluble in ether, benzene and chloroform. It has a density ($d_4^{20}$) of 1.2852. It has an atmospheric boiling point of about 235° C. at which temperature slight decomposition takes place as evidenced by an ammoniacal odor. The product evolves ammonia on boiling with sodium hydroxide solution.

*Example 2—Preparation of hydroxypropyl carbamates*

20 parts of propylene carbonate were added slowly with shaking over a period of 10 minutes to 22 parts of concentrated aqueous ammonia. This corresponds to an excess of about 100% ammonia over and above the amount required to react with the propylene carbonate. The carbonate dissolved readily. The temperature of the reaction mixture was prevented from exceeding 30° C. by intermittently cooling it in a water bath. After standing for a few hours at room temperature, water and unreacted ammonia were removed by vacuum evaporation at 80–100° C. 24 parts of residue not volatile at 100° C. and 3 mm. Hg pressure remained. This was subjected to distillation at a pressure of 0.2 mm. of Hg. 16.5 parts of hydroxypropyl carbamate were recovered.

The product thus recovered distilled between 109 and 114° C. at a pressure of 0.2 mm. of Hg. It has a refractive index ($n_D^{20}$) of 1.4623, a molecular refraction of 27.26, a hydroxyl equivalent of 121 and a density ($d_4^{20}$) of 1.2020. It is soluble in water, acetone, dioxane, ethyl acetate and methanol. It is insoluble in benzene and chloroform. Analysis of samples of the product showed it contained a carbon, hydrogen, nitrogen and oxygen content corresponding to the calculated amounts of these elements present in hydroxypropyl carbamate. Another appropriate name for this compound is propylene glycol monocarbamate.

*Example 3—Preparation of 2-hydroxybutyl 3-carbamate*

35 parts of 2,3-butylene carbonate were added slowly over a period of 45 minutes, with intermittent agitation to 36 parts of concentrated aqueous ammonia cooled in an ice bath to about 5° C. The carbonate dissolved as it reacted with the ammonia. The reaction mixture was allowed to stand over night, and was then subjected to vacuum evaporation on the steam bath. The residue was distilled at .4 mm. of Hg. 27 parts of product having a boiling point of 108–110° C. at .4 mm. of Hg were obtained.

The product has a refractive index ($n_D^{20}$) of 1.4612, a density ($d_4^{20}$) of 1.1506, and a molecular refractivity of 31.77. It has a hydroxyl equivalent of 131. Its solubility and insolubility characteristics were substantially the same as those of hydroxypropyl carbamate noted above. Analysis of samples of the product showed it contained a carbon, hydrogen, nitrogen and oxygen content corresponding to the calculated amounts of these elements present in 2-hydroxybutyl 3-carbamate. Another appropriate name for this compound is 2,3-butylene glycol monocarbamate.

*Example 4—Preparation of hydroxybutenyl carbamates*

35 parts of erythryl carbonate (vinyl ethylene carbonate) were added slowly over a period of twenty-five minutes to 38 parts of concentrated aqueous ammonia cooled by ice water to about 5° C. while agitating. During most of the period of agitation, the temperature was kept between 8° C. and 12° C. Water and excess ammonia were removed by vacuum evaporation, after which the residue was distilled at 0.5 mm. of Hg. pressure. 34 parts of product were thus obtained.

The product distilled at 117° C. to 121° C. at 0.5 mm. of Hg pressure. It has an index of refraction ($n_D^{20}$) of 1.4820, a hydroxyl equivalent of 131, a density ($d_4^{20}$) of 1.1920 and a molecular refractivity of 31.36. Analysis of samples of the product showed it contained a carbon, hydrogen, nitrogen and oxygen content corresponding to the calculated amounts of these elements present in hydroxybutenyl carbamate. Another appropriate name for this compound is erythryl monocarbamate.

It is to be understood that this invention is not restricted to the present disclosure otherwise than as defined by the appended claims.

What is claimed is:

1. A hydroxy carbamate from the group consisting of lower-hydroxyalkyl and lower-hydroxyalkenyl carbamates in which the hydroxy and carbamate radicals are on adjacent carbon atoms.
2. Vicinal hydroxy lower-alkyl carbamates.
3. Vicinal hydroxy lower-alkenyl carbamates.
4. Vicinal hydroxypropyl carbamates.
5. Vicinal hydroxybutenyl carbamates.
6. Hydroxyethyl carbamate.
7. 2-hydroxybutyl 3-carbamate.
8. A compound having the following structural formula:

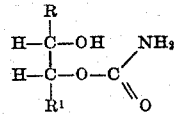

in which R and R$^1$ are from the group consisting of hydrogen, a lower- alkyl radical and a lower-alkenyl radical.

9. The process of producing a carbamate which comprises reacting ammonia with a compound having the formula:

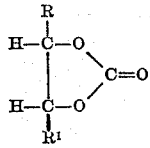

in which R and R$^1$ are from the group consisting of hydrogen, an alkyl radical and an alkenyl radical.

10. The process of producing hydroxyalkyl carbamates which comprises reacting ammonia with a compound having the formula:

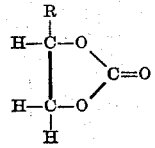

in which R is from the group consisting of hydrogen and an alkyl group, and isolating the hydroxyalkyl carbamate from the reaction mixture.

11. The process of producing hydroxyalkyl carbamates which comprises mixing a compound having the formula:

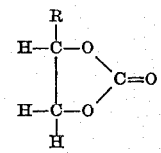

in which R is from the group consisting of hydrogen and an alkyl group, with ammonia in the proportions of more than one mol of ammonia per mol of said compound, at a temperature not exceeding about 50° C., distilling the reaction mixture under vacuum to remove unreacted ammonia and fractionally distilling the ammonia-free reaction mixture under vacuum to recover hydroxyalkyl carbamate therefrom.

12. The process of producing hydroxyethyl carbamate which comprises reacting ammonia with ethylene carbonate and isolating the hydroxyethyl carbamate from the reaction mixture.

13. The process of producing hydroxyethyl carbamate which comprises mixing ethylene carbonate with ammonia in the proportions of more than one mol of ammonia per mol of ethylene carbonate at a temperature not exceeding about 50° C., distilling the reaction mixture under vacuum to remove unreacted ammonia, and fractionally distilling the ammonia-free reaction mixture under vacuum to recover the hydroxyethyl carbamate therefrom.

14. The process of producing hydroxypropyl carbamates which comprises reacting ammonia with propylene carbonate and isolating the hydroxypropyl carbamates from the reaction mixture.

15. The process of producing 2-hydroxybutyl 3-carbamate which comprises reacting ammonia with 2,3-butylene carbonate and isolating the 2-hydroxybutyl 3-carbamate from the reaction mixture.

16. The process of producing hydroxybutenyl carbamates which comprises reacting ammonia with vinyl ethylene carbonate and isolating the hydroxybutenyl carbamates from the reaction mixture.

JOHN DAVID MALKEMUS.

FOREIGN PATENTS

| Number | Country | Date |
|--------|---------|------|
| 501,852 | Germany | July 4, 1930 |